Jan. 3, 1967 W. E. BOWE 3,295,673

SPOOL DEVICES

Filed April 6, 1965

INVENTOR
WILLIAM E. BOWE

BY, Robert T. Dunn

ATTORNEY

United States Patent Office 3,295,673
Patented Jan. 3, 1967

3,295,673
SPOOL DEVICES

William E. Bowe, 33 Torre St., Reading, Mass. 01867

Filed Apr. 6, 1965, Ser. No. 446,044
8 Claims. (Cl. 206—52)

This invention relates to spools and more particularly to a spool for storing a continuous tape.

Continuous tapes are employed extensively in industry to program computers that control industrial processes. The continuous tape is particularly useful to program continuously repeated operations such as a complex machining operation or to control a flow process in which a repeated series of measurements, computations and adjustments are made.

A number of different methods are employed to store the program information on the tape. In accordance with one technique, holes are punched in the tape at coded positions and so the positions, groupings and sequences of the holes are indicative of the information. During operation the tape is read by equipment including light sources and photo-detector devices which respond to the light. Light is directed to the moving tape so that the light shines through the holes and energizes the photo-detectors in such a manner that as each hole passes a light source, a separate and distinct signal is generated in the output of a photo-detector. It is most important that there be no tears, cracks or breaks of any kind in the tape through which the light could shine and produce a false signal in the output of a photo-detector. A false signal could result in substantial destruction and waste of valuable production.

Computer tapes of the type described above and other similar types are often subject to repeated handling by computer personnel particularly when the tape is changed. The tape must be handled carefully and stored in such a manner that it is not creased or folded sharply. For this purpose it has been the practice to loop the tape gently over a number of widely spaced pins. Thus, considerable space and bulky equipment has been required to store the tape. It is one object of the present invention to provide a compact storage device for such tape and at the same time protect the tape from damage.

It is another object of the present invention to provide a spool for storing a continuous tape such as the computer tape mentioned above, whereby the chance of incurring tears, cracks or breaks in the tape is avoided.

In accordance with features of the present invention a set of posts are provided in relatively close proximity to each other attached to a base so that the continuous tape, which is to be stored, can be hooked over one of the posts of the set and wound around the set, the post over which the tape is hooked having a radius at least as great as the minimum radius upon which the tape can be turned without causing injury to the tape or undue fatigue which could lead to cracking. An additional post having at least the same minimum radius and which is moveable with respect to the set of posts is inserted through the loop at the loose end of the tape so that the tape can be wound tight about the set of posts and the moveable post can be fixed in position adjacent the set to thereby store the tape.

In various embodiments the moveable post is fixed in position adjacent the set and a clamp or band is placed around the tightly wound tape and posts or the moveable post can be fastened to the base or to a cover which is separate from the base. For example, a cover for the stored tape may provide the dual purpose of protecting the stored tape and mounting the moveable post so that when the cover is set on the base, the moveable post attached thereto engages the loop at the loose end of the tape. Thereafter the cover is rotated relative to the base so as to pull the tape tight about the set of posts.

In various other embodiments, the posts in the set are of different shape and size and disposed on the same or different axes; however, in all embodiments the tape is first looped over less than all of the posts in the set and then wound around all of the posts in the set.

Other objects and features of the present invention will be apparent from the folowing specific descriptions of embodiments of the invention taken in conjunction with the figures in which.

Figure 3A:
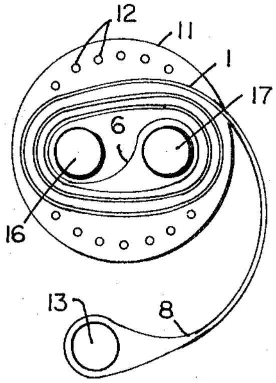
Figure 3B:
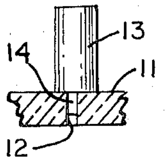

FIGURES 3*a* and 3*b* are top and section views of a similiar embodiment in which the moveable post is secured by attachment to the base.

Figure 4:
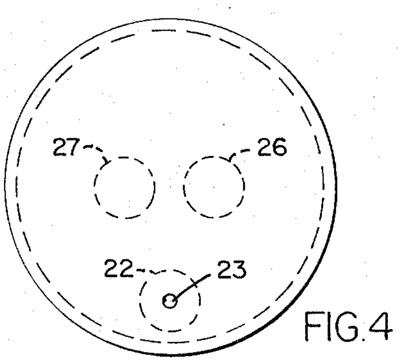
Figure 5:
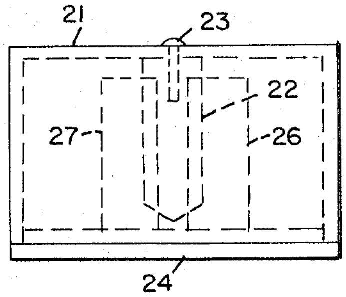

FIGURES 4 and 5 are plan and front views of an embodiment including a cover in which the moveable post is mounted.

Figure 6:
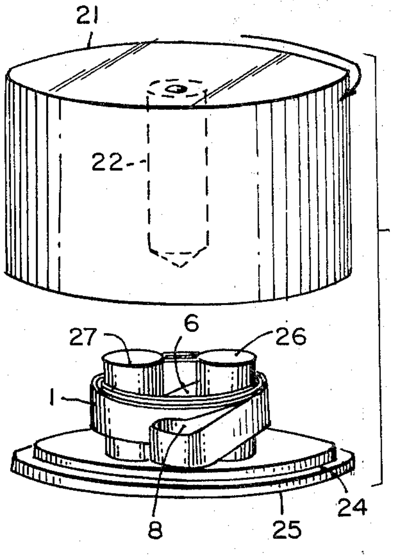

FIGURE 6 is a perspective view of the same device; and

Figure 7:
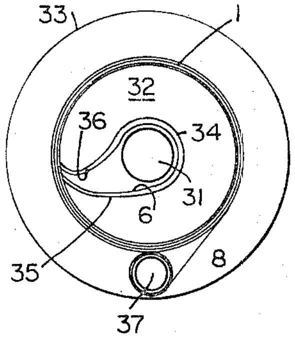
Figure 8:
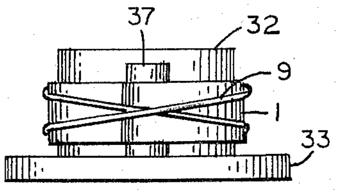

FIGURES 7 and 8 are plan and front views of an embodiment in which the fixed posts are of different shape and size and concentrically disposed.

Figure 1:
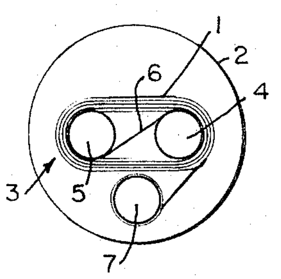
FIGURE 1 is a plan view of an embodiment in which the set includes identical posts disposed adjacent each other.
Figure 2:
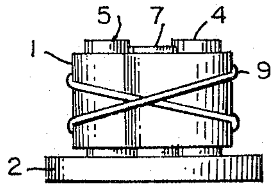
FIGURE 2 is a front view of the same embodiment.

Turning first to FIGURES 1 and 2 there is shown a spool for storing a continuous tape 1. The spool includes a base 2 upon which a set 3 of posts 4 and 5 are fixedly mounted. The radii of these posts are substantially greater than the minimum radius upon which the tape can be turned without danger of creasing, cracking or otherwise damaging the tape or altering the fidelity of storage of information on the tape. The posts and base are made of metal, plastic, or wood or any material that has substantially no damaging effect on the tape. The posts are mounted on the base employing any of a number of convenient methods. For example, they may be force fitted in holes in the base. The preferred method of mounting may depend upon the materials employed.

The continuous tape 1 is wound on the spool by first looping one end 6 of the tape over one of the posts 4 or 5 and then winding the double thickness of tape around the set. This process is illustrated in FIGURE 3*a*. Next a moveable or loose post 7 is inserted in the loop 8 at the other end of the tape and the tape is pulled tight about the set 3. The loose post 7 is then placed adjacent the wound tape and a clamp or band 9 is applied around the posts and tape to secure the loose post in place.

FIGURE 3*a* illustrates a similiar embodiment in which the base 11 includes accommodations such as holes 12 for securing the loose post 13. For example, the post 13 carries a pin 14 on the bottom which fits the holes, thus fixing the post 13 at any of a number of positions around the posts 16 and 17.

Another embodiment which is illustrated in FIGURES 4, 5 and 6 includes a cap or cover 21 to which the moveable post 22 is fastened by pin 23. The cover 21 mates with a groove 24 along the perimeter of the base 25 to which the pair of fixed posts 26 and 27 are fixed. One end 6 of the continuous tape 1 is looped over post 26 and the tape is wound around the posts 26 and 27 as shown. The cover 21 is then lowered onto the base as shown in FIGURE 6 so that the post 22 engages the loop 8 of the tape and the lower rim 29 of the cover engages the groove 24. Then the cover is turned relative to the base in the same direction as the tape is wound, pulling the tape tight around the posts 25 and 26.

As mentioned above, the set of posts about which the tape is found may be of different shape and size and disposed concentric to each other. An embodiment of the invention of this sort is illustrated in FIGURES 7 and 8. The plan view in FIGURE 8 shows the set of posts 31 and 32 of different shape and size and fixed to the base 33 on a common axis. The center post 31 is a solid cylinder similar to the posts already mentioned. However, the other post 32 is substantially larger in diameter (preferably over twice the diameter) and has an opening 34 at the center to accommodate the center post and sufficient additional space to permit the end 6 of the tape to be looped over the center post.

The opening 34 is extended by a contoured slot 35 which extends to the periphery of the post 32 and meets the periphery substantially asymptotically. The slot is contoured so as to provide a curved surface 36 against which the tape bears, the radius of curvature being substantially the same as the radius of post 31. Thus, the tape 1 is mounted by feeding one end into the slot 35 and looping it over the post 31, then winding the rest of the tape around the large diameter post 32. The tape is secured tightly in place by inserting a movable post 37 in the loop 8 at the loose end of the tape which is then fastened securely for storage by employing any of the techniques already described above with reference to FIGURES 1 to 6.

This completes descriptions of a number of embodiments of the present invention all including a set of posts one of which serves to anchor one end of a continuous tape so that the tape can be wound around the set and with means for engaging the loose end of the tape and securing it in place.

What is claimed is:

1. A device for holding a tape comprising a plurality of members spaced apart to permit looping one end of said tape around less than all of said members, a substantially flat base for holding said members so that all of said members extend in the same direction from said base and said tape can be wound around all of said members, an additional member which is movable with respect to said plurality of members for engaging the other end of said tape and means for fixing the position of said moveable member.

2. A device for holding a tape comprising a plurality of cylindrical members spaced apart to permit looping one end of said tape around less than all of said members, a substantially flat base from which said members project in a direction transverse thereto so that said tape can be wound around all of said members, an additional cylindrical member which is movable with respect to said plurality of members for engaging the other end of said tape and means for fixing the position of said moveable member.

3. A device for holding a tape comprising a plurality of cylindrical members spaced apart to permit looping one end of said tape around less than all of said members, a substantially flat base for supporting said members and from which said members project from one side thereof with axes parallel so that said tape can be wound around all of said members, an additional cylindrical member which is moveable with respect to said plurality of members for engaging the other end of said tape and means for fixing the position of said moveable member.

4. A device for holding a continuous tape comprising a plurality of cylindrical members oriented parallel to each other, a base for supporting said members, at one end thereof, an additional cylindrical member which is moveable with respect to said plurality of members and means for fixing the position of said moveable member, the positioning of the members of said plurality being such that said tape is held by looping one end of said tape over less than all of said plurality of members, winding the tape around all of said plurality of members, looping the other end of said tape around said moveable member and fixing the position of said moveable member.

5. A device for holding a continuous tape comprising a plurality of cylindrical members oriented parallel to each other, means for fixedly supporting said members so that they are spaced from each other by at least the thickness of said tape and less than the diameter of the smallest of said members, an additional cylindrical member of at least the same diameter and which is moveable with respect to said plurality of members and means for fixing the position of said moveable member, the positioning of the members of said plurality being such that said tape is held by looping one end of said tape over less than all of said plurality of members, winding the tape around all of said plurality of members, looping the other end of said tape around said moveable member and fixing the position of said moveable member.

6. A device for storing a continuous tape comprising a base, a plurality of posts mounted on said base and extending therefrom in the same direction, the spacing between said posts being such that one end of said tape can be looped over less than all of said posts and wound around all of said posts, a cover for enclosing said wound tape and means mounted to said cover for engaging the other end of said tape and holding the tape in the wound position.

7. A device for storing a continuous tape comprising a base, a plurality of posts mounted on said base on different axes and extending therefrom in the same direction, the spacing between said posts being such that one end of said tape can be looped over less than all of said posts and wound around all of said posts and means including a moveable post for engaging the other end of said tape and holding the tape in position.

8. A device for storing a continuous tape comprising a base, two posts which are concentrically mounted one inside the other on said base and extending therefrom, a slot extending from the inside to the outside of the outer of said two posts, the spacing between said posts being such that one end of said tape can be looped over said inside post and wound around said outer post and means including a moveable post for engaging the other end of said tape and holding the tape in position.

References Cited by the Examiner

UNITED STATES PATENTS

| | | | |
|---|---|---|---|
| 1,784,366 | 12/1930 | Littlefield | 206—46 |
| 3,186,543 | 6/1965 | Minick et al. | 206—59 |
| 3,204,888 | 9/1965 | Bernat | 206—53 |

THERON E. CONDON, *Primary Examiner.*

WILLIAM T. DIXSON, Jr., *Examiner.*